(12) United States Patent
Park et al.

(10) Patent No.: US 12,241,503 B2
(45) Date of Patent: Mar. 4, 2025

(54) BEARING FOR PARTIALLY SPHERICAL COMPONENT AND METHOD OF MAKING AND USING THE SAME

(71) Applicant: SAINT-GOBAIN PERFORMANCE PLASTICS CORPORATION, Solon, OH (US)

(72) Inventors: JunYoung Park, Gwangmyeong (KR); Eunhee Jang, Incheon (KR); Seungchul Jun, Gimpo-si (KR)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 749 days.

(21) Appl. No.: 17/451,722

(22) Filed: Oct. 21, 2021

(65) Prior Publication Data
US 2022/0128087 A1  Apr. 28, 2022

Related U.S. Application Data

(60) Provisional application No. 63/104,994, filed on Oct. 23, 2020.

(51) Int. Cl.
*F16C 11/06* (2006.01)
(52) U.S. Cl.
CPC ................ *F16C 11/0623* (2013.01)
(58) Field of Classification Search
CPC . F16C 11/069; F16C 11/0638; F16C 11/0657; F16C 11/0685; F16C 11/0623; F16C 11/0628
See application file for complete search history.

(56) References Cited

U.S. PATENT DOCUMENTS

| | | | |
|---|---|---|---|
| 2,740,649 | A | 8/1950 | Latzen |
| 2,814,538 | A | 11/1957 | Connolly |
| 3,164,389 | A | 1/1965 | Thomas |
| 3,843,272 | A | 10/1974 | Jorn |

(Continued)

FOREIGN PATENT DOCUMENTS

| | | | |
|---|---|---|---|
| CN | 110793772 A | | 2/2020 |
| GB | 875003 A | | 8/1961 |

(Continued)

OTHER PUBLICATIONS

International Search Report and Written Opinion for PCT/US2021/071960, mailed Feb. 15, 2022, 10 pages.

*Primary Examiner* — Daniel J Wiley
(74) *Attorney, Agent, or Firm* — Abel Schillinger, LLP; Ann Palma

(57) ABSTRACT

A bearing for an at least partially spherical component, the bearing including a first portion and a complementary second portion integral with the first portion and joined by a folded-over bridge portion, the first portion and the second portion each including an arcuate inner surface, where the first portion and the second portion are adapted to at least partially surround and provide a compressive spring force against the component to form a joint assembly allowing for rotation of the component, where the first portion and the second portion form a semispherical void around the component, and where the bearing includes a metal substrate and a low friction layer overlying at least one surface of the substrate.

20 Claims, 3 Drawing Sheets

(56) References Cited

U.S. PATENT DOCUMENTS

| | | | |
|---|---|---|---|
| 4,360,284 A * | 11/1982 | Brandenburg | F16C 11/0614 |
| | | | 403/135 |
| 4,701,064 A * | 10/1987 | Mizusawa | F16C 11/0657 |
| | | | 403/141 |
| 5,813,789 A * | 9/1998 | Prickler | F16C 11/0638 |
| | | | 403/135 |
| 5,959,758 A | 9/1999 | Seo | |
| 6,201,644 B1 | 3/2001 | Sakata et al. | |
| 6,328,269 B1 | 12/2001 | Krautloher | |
| 7,343,935 B2 * | 3/2008 | Butz | F16K 1/221 |
| | | | 137/637.1 |
| 7,388,700 B1 | 6/2008 | Odhner | |
| 7,534,965 B1 | 5/2009 | Thompson | |
| 7,661,902 B2 * | 2/2010 | Brunneke | F16C 33/122 |
| | | | 403/143 |
| 8,333,513 B2 * | 12/2012 | Budde | F16C 11/0638 |
| | | | 384/192 |
| 8,984,817 B2 | 3/2015 | Weiden et al. | |
| 10,684,464 B2 | 6/2020 | Aschwanden et al. | |
| 2002/0181839 A1 | 12/2002 | Brown et al. | |
| 2007/0230849 A1 | 10/2007 | Naito | |
| 2010/0092119 A1 | 4/2010 | Angenheister | |
| 2014/0140755 A1 | 5/2014 | Clavijo Lumbreras | |
| 2015/0354624 A1 | 12/2015 | Speicher | |
| 2016/0069112 A1 | 3/2016 | Neumark et al. | |

FOREIGN PATENT DOCUMENTS

| | | |
|---|---|---|
| JP | 2004257540 A | 9/2004 |
| JP | 2006007887 A | 1/2006 |
| JP | 2014529542 A | 11/2014 |
| JP | 2017534075 A | 11/2017 |
| KR | 200363128 Y1 | 9/2004 |
| KR | 101150844 B1 | 7/2012 |
| RU | 2615024 C1 | 4/2017 |
| WO | 2020129091 A1 | 6/2020 |
| WO | 2022087612 A1 | 4/2022 |

\* cited by examiner

BEARING FOR PARTIALLY SPHERICAL COMPONENT AND METHOD OF MAKING AND USING THE SAME

CROSS-REFERENCE TO RELATED APPLICATION(S)

This application claims priority under 35 U.S.C. § 119(e) to U.S. Provisional Application No. 63/104,994, entitled "BEARING FOR PARTIALLY SPHERICAL COMPONENT AND METHOD OF MAKING AND USING THE SAME," by JunYoung PARK et al., filed Oct. 23, 2020, which is assigned to the current assignee hereof and incorporated herein by reference in its entirety.

FIELD OF THE DISCLOSURE

The present disclosure is directed to bearing and bearing assemblies, particularly the present disclosure is directed to a bearing for a partially spherical component to form a joint assembly.

DESCRIPTION OF THE RELATED ART

Articulating components (e.g., ball bearings) are used as attachments between components in a number of applications such as, but not limited to, vehicle components. Such components are generally coupled to a housing to form a joint assembly. One particular area of development has been using these joint assemblies as ball joint support structures with multiple applications including, but not limited to, vehicle, aerospace, and other mechanical applications. Industries continue to need improvements in joint assemblies and bearing members used in such joint assemblies.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing assembly arts.

Figure 1:
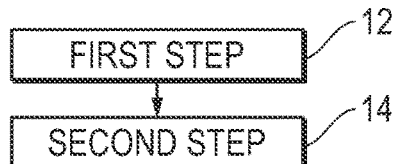
FIG. 1 includes a stepwise manufacturing process.

For purposes of illustration, FIG. 1 includes a diagram showing a stepwise manufacturing process 10 for forming a bearing. The forming process 10 may include a first step 12 of providing a material or composite material including a substrate. The forming process 10 may further include a second step 14 of manipulating the ends of the material or composite material to form a bearing.

Figure 2A:
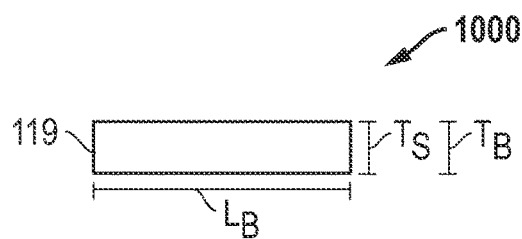
FIG. 2A includes an illustration of a material that may be formed into a bearing according to a number of embodiments.

FIG. 2A includes an illustration of a material 1000 that may be formed into the bearing of the first step 12 of the forming process 10. The bearing may include a substrate 119. In an embodiment, the substrate 119 can at least partially include a metal. According to certain embodiments, the metal may include iron, copper, titanium, tin, aluminum, alloys thereof, or may be another type of metal. More particularly, the substrate 119 can at least partially include a steel, such as, a stainless steel, carbon steel, or spring steel. For example, the substrate 119 can at least partially include a stainless steel. The stainless steel may be annealed, ¼ hard, ½ hard, ¾ hard, or full hard. Moreover, the steel can include stainless steel including chrome, nickel, or a combination thereof. In an embodiment, the substrate 119 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the substrate 119 may not include a mesh or grid. Further, the substrate 119 can include a Vickers pyramid number hardness, VPN, which can be 350, such as 375, 400, 425, or 450. VPN can also be X500, X475, or 450. VPN can also be within a range between, and including, any of the VPN values described herein. In another aspect, the substrate 119 can be treated to increase its corrosion resistance. In particular, the substrate 119 can be passivated. For example, the substrate 119 can be passivated according to the ASTM standard A967. The substrate 119 may be formed by at least one of chamfering, turning, reaming, forging, extruding, molding, sintering, rolling, or casting.

The substrate 119 can have a thickness Ts of between about 10 microns to about 1500 microns, such as between about 50 microns and about 1000 microns, such as between about 100 microns and about 750 microns, such as between about 350 microns and about 650 microns. In a number of embodiments, the substrate 119 may have a thickness Ts of between about 700 and 800 microns. In a number of embodiments, the substrate 119 may have a thickness Ts of between about 950 and 1050 microns. It will be further appreciated that the thickness Ts of the substrate 119 may be any value between any of the minimum and maximum values noted above. The thickness of the substrate 119 may be uniform, i.e., a thickness at a first location of the substrate 119 can be equal to a thickness at a second location therealong. The thickness of the substrate 119 may be non-uniform, i.e., a thickness at a first location of the substrate 119 can be different from a thickness at a second location therealong.

Figure 2B:
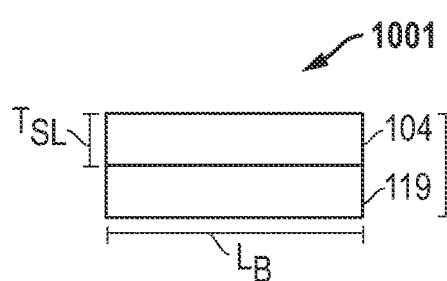
FIG. 2B includes an illustration of a composite material that may be formed into a bearing according to a number of embodiments.

FIG. 2B includes an illustration of a composite material 1001, alternative to the material 1000, that may be formed into the bearing of the first step 12 of the forming process 10. For purposes of illustration, FIG. 2B shows the layer-by-layer configuration of a composite material 1001 of the bearing. In a number of embodiments, the composite material 1001 may include substrate 119 (as mentioned above) and low friction layer 104 coupled to or overlying the substrate 119. In a more particular embodiment, the composite material 1001 may include a substrate 119 and a plurality of one low friction layers 104 overlying the substrate 119. As shown in FIG. 2B, the low friction layer 104 can be coupled to at least a portion of the substrate 119. In a particular embodiment, the low friction layer 104 can be coupled to a surface of the substrate 119 so as to form an interface with another surface of another component. The low friction layer 104 can be coupled to the radially inner surface of the substrate 119. Alternatively, the low friction layer 104 can be coupled to the radially outer surface of the substrate 119.

In a number of embodiments, the low friction layer 104 can include a low friction material. Low friction materials may include, for example, a polymer, such as a polyketone, a polyaramid, a polyphenylene sulfide, a polyethersulfone, a polypheylene sulfone, a polyamideimide, ultra-high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 104 includes polyketone, such as polyether ether ketone (PEEK), polyether ketone, polyether ketone ketone, polyether ketone ether ketone, a derivative thereof, or a combination thereof. In an additional example, the low friction layer 104 may include an ultra-high molecular weight polyethylene. In another example, the low friction layer 104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, titanium, tungsten, iron, bronze, steel, spring steel, stainless steel), a metal alloy (including the metals listed), an anodized metal (including the metals listed) or any combination thereof. Fluoropolymers may be used according to particular embodiments. In an embodiment, the low friction layer 104 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the low friction layer 104 may not include a mesh or grid.

In a number of embodiments, the low friction layer 104 may further include fillers, including glass, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, graphene, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

In some embodiments, the low friction layer 104 may include a damping material. The damping material can include natural polyisoprene, synthetic polyisoprene, polybutadiene, chloroprene rubber, butyl rubber, styrene-butadiene rubber, nitrile rubber, ethylene propylene, rubber, ephichlorohydrin rubber, polyacrylic rubber, silicone rubber, fluorosilicone rubber, fluoroelastomers, perfluoroelastomers, polyether block amides, bitumen, polyethylene, chlorosulfonated polyethylene, ethyl-vinyl acetate (EVA), EVA foam, low-density polyethylene foam, nitrile rubber foam, polychloroprene foam, polyimide foam, polypropylene foam, polyurethane foam, polystyrene foam, polyvinyl chloride foam, silicone foam, foam rubber, polyurethane foam, XPS foam, epoxy foam, phenolic foam, or any combination thereof. The damping layer 104 may include a solid based material including lithium soap, latex, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof.

In an embodiment, the low friction layer 104 can have a thickness $T_{SL}$ of between about 1 micron to about 500 microns, such as between about 10 microns and about 350 microns, such as between about 30 microns and about 300 microns, such as between about 40 microns and about 250 microns. In a number of embodiments, the low friction layer 104 may have a thickness $T_{SL}$ of between about 50 and 300 microns. It will be further appreciated that the thickness $T_{SL}$ of the low friction layer 104 may be any value between any of the minimum and maximum values noted above. The thickness of the low friction layer 104 may be uniform, i.e., a thickness at a first location of the low friction layer 104 can be equal to a thickness at a second location therealong. The thickness of the low friction layer 104 may be non-uniform, i.e., a thickness at a first location of the low friction layer 104 can be different from a thickness at a second location therealong. It can be appreciated that different low friction layers 104 may have different thicknesses. The low friction layer 104 may overlie one major surface of the substrate 119, shown, or overlie both major surfaces. The substrate 119 may be at least partially encapsulated by the low friction layer 104. That is, the low friction layer 104 may cover at least a portion of the substrate 119.

Figure 2C:
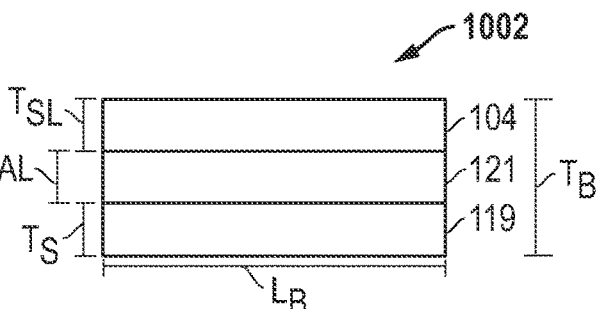
FIG. 2C includes an illustration of a composite material that may be formed into a bearing according to a number of embodiments.

FIG. 2C includes an illustration of an alternative embodiment of the composite material 1002, alternative to the materials 1000, 1001, that may be formed into the bearing of the first step 12 of the forming process 10. For purposes of illustration, FIG. 2C shows the layer-by-layer configuration of a composite material 1002 of the bearing. According to this particular embodiment, the composite material 1002 may be similar to the composite material 1001 of FIG. 2B, except this composite material 1002 may also include at least one adhesive layer 121 that may couple the low friction layer 104 to the substrate 119 and a low friction layer 104. In another alternate embodiment, the substrate 119, as a solid component, woven mesh or expanded metal grid, may be embedded between at least one adhesive layer 121 included between the low friction layer 104 and the substrate 119.

The adhesive layer 121 may include any known adhesive material common to the bearing arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer.

Filler particles (functional and/or nonfunctional) may be added into the adhesive layer 121 such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof.

In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 121 can have a thickness $T_{AL}$ of between about 1 micron to about 80 microns, such as between about 10 microns and about 50 microns, such as between about 20 microns and about 40 microns. In a number of embodiments, the adhesive layer 121 may have a thickness $T_{AL}$ of between about 3 and 20 microns. In a number of embodiments, the adhesive layer 121 may have a thickness $T_{AL}$ of between about 10 and 60 microns. It will be further appreciated that the thickness $T_{AL}$ of the adhesive layer 121 may be any value between any of the minimum and maximum values noted above. The thickness of the adhesive layer 121 may be uniform, i.e., a thickness at a first location of the adhesive layer 121 can be equal to a thickness at a second location therealong. The thickness of the adhesive layer 121 may be non-uniform, i.e., a thickness at a first location of the adhesive layer 121 can be different from a thickness at a second location therealong.

Figure 2D:
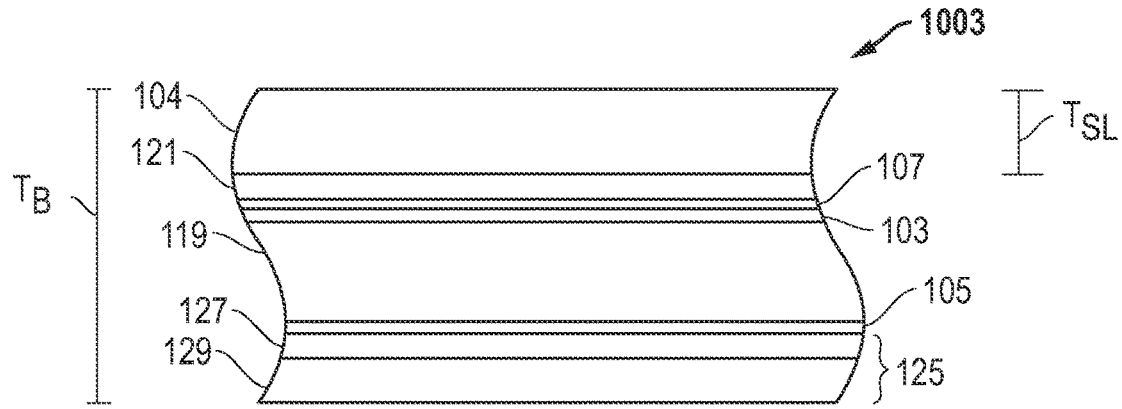
FIG. 2D includes an illustration of a composite material that may be formed into a bearing according to a number of embodiments.

FIG. 2D includes an illustration of an alternative embodiment of the composite material 1003, alternative to the materials 1000, 1001, 1002, that may be formed into the bearing of the first step 12 of the forming process 10. For purposes of illustration, FIG. 2D shows the layer-by-layer configuration of a composite material 1003 of the bearing. According to this particular embodiment, the composite material 1003 may be similar to the composite material 1002 of FIG. 2C, except this composite material 1003 may also include at least one corrosion protection layer 103 and 105, and a corrosion resistant coating layer 125 that can include an adhesion promoter layer 127 and an epoxy layer 129 that may couple to the substrate 119 and a low friction layer 104.

The substrate 119 may be coated with corrosion protection layers 103 and 105 including corrosion protection material to prevent corrosion of the composite material 1003 prior to processing. Additionally, a functional layer 107 can be applied over layer 103. Each of layers 103, 105, and 107 can have a thickness of about 1 to 50 microns, such as about 7 to 15 microns. Layers 103 and 105 can include corrosion protection materials including a phosphate of zinc, iron, manganese, or any combination thereof, or a nano-ceramic layer. Further, layers 103 and 105 can include corrosion protection materials including passivated surfaces, commercially available zinc (mechanical/galvanic) or zinc-nickel coatings, or any combination thereof. Layer 107 can include functional silanes, nano-scaled silane-based primers, hydrolyzed silanes, organosilane adhesion promoters, solvent/water-based silane primers. Corrosion protection layers 103 and 105 can be removed or retained during processing.

As stated above, the composite material 1003 may further include a corrosion resistant coating 125. The corrosion resistant coating 125 can have a thickness of about 1 to 50 microns, such as about 5 to 20 microns, and such as about 7 to 15 microns. The corrosion resistant coating 125 can include an adhesion promoter layer 127 and an epoxy layer 129. The adhesion promoter layer 127 can include corrosion protection materials including phosphate of zinc, iron, manganese, tin, or any combination thereof, or a nano-ceramic layer. The adhesion promoter layer 127 can include corrosion protection materials including functional silanes, nano-scaled silane-based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The adhesion promoter layer 127 can be applied by spray coating, e-coating, dip spin coating, electrostatic coating, flow coating, roll coating, knife coating, coil coating, or the like.

The epoxy layer 129 can be corrosion protection materials including a thermal cured epoxy, a UV cured epoxy, an IR cured epoxy, an electron beam cured epoxy, a radiation cured epoxy, or an air-cured epoxy. Further, the epoxy layer 129 can include corrosion protection materials including polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners such as chromium, polyamides, or any combination thereof. Generally, acid anhydrides can conform to the formula R—C=O—O—C=O—R' where R can be CXHYXZAU as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula R1R2R3N where R can be CXHYXZAU as described above. In an embodiment, the epoxy layer 129 can include fillers to improve the conductivity, such as carbon fillers, carbon fibers, carbon particles, graphite, metallic fillers such as bronze, aluminum, and other metals and their alloys, metal oxide fillers, metal-coated carbon fillers, metal-coated polymer fillers, or any combination thereof. The conductive fillers can allow current to pass through the epoxy coating and can increase the conductivity of the composite material as compared to a composite material without conductive fillers. In an embodiment, the epoxy layer 129 can be applied by spray coating, e-coating, dip spin coating, electrostatic coating, flow coating, roll coating, knife coating, coil coating, or the like. Additionally, the epoxy layer 129 can be cured, such as by thermal curing, UV curing, IR curing, electron beam curing, irradiation curing, or any combination thereof. Preferably, the curing can be accomplished without increasing the temperature of the component above the breakdown temperature of any of the low friction layer 104, the adhesive layer 121, the substrate 119, or the adhesion promoter layer 127. Accordingly, the epoxy may be cured below about 250° C., even below about 200° C.

Figure 2E:
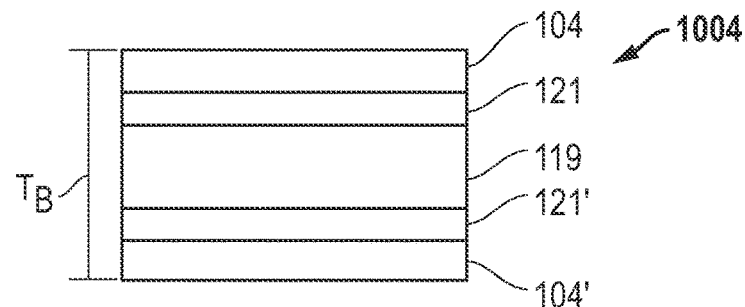
FIG. 2E includes an illustration of a composite material that may be formed into a bearing according to a number of embodiments.

FIG. 2E includes an illustration of an alternative embodiment of the composite material 1004, alternative to the materials 1000, 1001, 1002, and 1003 that may be formed into the bearing of the first step 12 of the forming process 10. According to this particular embodiment, the composite material 1004 may be similar to the composite material 1000 of FIG. 2C, except this composite material 1002 may include a substrate 119 and a plurality of low friction layers 1104, 1104' coupled to the substrate 119 by a plurality of adhesive layers 1121, 1121'. It may be understood that any of the intervening layers (i.e., corrosion protection layers 1704, 1705, and 1708, or corrosion resistant layer 1125 that can include an adhesion promoter layer 1127 and/or an epoxy layer 1129) of the composite material 1001 shown in FIG. 2D may be included between any of the layers shown in FIG. 2E in any orientation or stacking.

In a number of embodiments, the material or composite material 1000, 1001, 1002, 1003, 1004 may have a particular thickness $T_B$. According to certain embodiments, the thickness $T_B$ of the material or composite material 1000, 1001, 1002, 1003, 1004 may be at least about 0.1 mm or at least about 0.2 mm or at least about 0.5 mm or at least about 0.8 mm or even at least about 1.5 mm. According to still other embodiments, the $T_B$ of the material or composite material 1000, 1001, 1002, 1003, 1004 may be not greater than about 2 mm, such as, not greater than about 1.5 mm or even not greater than about 1.0 mm. It will be appreciated that the thickness $T_B$ of the material or composite material 1000, 1001, 1002, 1003, 1004 may be within a range between any of the minimum and maximum values noted above. It will be further appreciated that the thickness $T_B$ of the material or composite material 1000, 1001, 1002, 1003, 1004 may be any value between any of the minimum and maximum values noted above. It can also be appreciated that the thickness $T_B$ of the material or composite material 1000, 1001, 1002, 1003, 1004 may vary along its circumference. It can also be appreciated that thickness $T_B$ of the material or composite material 1000, 1001, 1002, 1003, 1004 may vary along its circumference and may vary across a plurality of materials or composite materials.

In an embodiment, under step 12 of FIG. 1, any of the layers on the material or composite material 1000, 1001, 1002, 1003, 1004, as described above, can each be disposed in a roll and peeled therefrom to join together under pressure, at elevated temperatures (hot or cold pressed or rolled), by an adhesive, or by any combination thereof. Any of the layers of the material or composite material 1000, 1001, 1002, 1003, 1004, as described above, may be laminated together such that they at least partially overlap one another. Any of the layers on the material or composite material 1000, 1001, 1002, 1003, 1004, as described above, may be applied together using coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In an embodiment, the material or composite material 1000, 1001, 1002, 1003, 1004, may be a single unitary strip of material.

In other embodiments, under step 12 of FIG. 1, any of the layers on the material or composite material 1000, 1001, 1002, 1003, 1004, as described above, may be applied by a coating technique, such as, for example, physical or vapor deposition, spraying, plating, powder coating, or through other chemical or electrochemical techniques. In a particular embodiment, the low friction layer 104 may be applied by a roll-to-roll coating process, including for example, extrusion coating. The low friction layer 104 may be heated to a molten or semi-molten state and extruded through a slot die onto a major surface of the substrate 119. In another embodiment, the low friction layer 104 may be cast or molded.

In an embodiment, the low friction layer 104 or any layers can be glued to the substrate 119 using the melt adhesive layer 121 to form a laminate. In an embodiment, any of the intervening or outstanding layers on the material or composite material 1000, 1001, 1002, 1003, 1004, may form an intermediate material, e.g., a laminate. The intermediate material can be cut into strips or blanks that can be formed into the bearing. The cutting of the intermediate material may include use of a stamp, press, punch, saw, or may be machined in a different way. Cutting the intermediate material can create cut edges including an exposed portion of the substrate 119.

In an embodiment, under the second step 14 of FIG. 1, the blanks (formed of the material or composite material 1000, 1001, 1002, 1003, 1004) can be formed into the bearing by manipulating the ends of the laminate strip or blank. The bearing may be formed by stamp, press, punch, saw, rolling, flanging, deep-drawing, or may be machined in a different way. After shaping the semi-finished bearing, the semi-finished bearing may be cleaned to remove any lubricants and oils used in the forming and shaping process. Additionally, cleaning can prepare the exposed surface of the load bearing substrate for the application of the coating. Cleaning may include chemical cleaning with solvents and/or mechanical cleaning, such as ultrasonic cleaning.

Figure 3A:
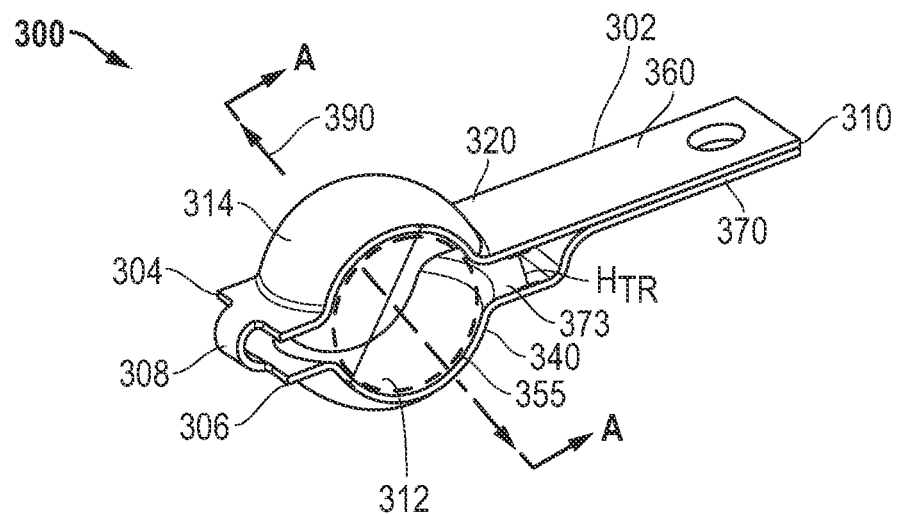
FIG. 3A includes an illustration of a top perspective view of a bearing in an installed position according to a number of embodiments.

FIG. 3A includes an illustration of a top perspective view of a bearing 300 in an installed position according to a number of embodiments and formed from a blank of material or composite material 1000, 1001, 1002, 1003, 1004 as described above. As shown in FIG. 3A, the bearing 300 may include a semi-annular strip 302. The semi-annular strip 302 may be formed from a blank as described above that may be partially curved into an arc-like shape about a central axis 390. The bearing 300 and/or semi-annular strip 302 may have a first axial end 304 and a second axial end 306. The bearing 300 and/or semi-annular strip 302 may have a first circumferential end (or proximal end) 308, and a second circumferential end (or distal end) 310. The bearing 300 and/or semi-annular strip 302 may have an inner surface 312, and an outer surface 314. The bearing 300 and/or semi-annular strip 302 may have a first portion 320 and a second portion 340 axially opposite the first portion 320. The bearing 300 and/or semi-annular strip 302 may have a folded-over bridge portion 360 disposed between the first portion 320 and the second portion 340 to join the first portion 320 and the second portion 340. Initially, the bearing 300 may be unmodified in an uninstalled position as described in further detail below. In a number of embodiments, the first portion 320 and the second portion 340 may be placed around another component to place the bearing 300 in an installed position as described in further detail below. The inner surface 312 of the bearing 300 and/or semi-annular strip 302 may have a low friction layer that conforms to the shape of the semi-annular strip 302 with a substrate forming the outer surface 314, as formed from the material or composite material 1000, 1001, 1002, 1003, 1004 as described above. Alternatively or additionally, the outer surface 314 of the bearing 300 may have a low friction layer that conforms to the shape of the semi-annular strip 302 with a substrate forming the inner surface 312, as formed from the material or composite material 1000, 1001, 1002, 1003, 1004 as described above. In other embodiments, the low friction layer may be laminated onto both inner and outer surfaces 312, 314 of the bearing 300 and/or semi-annular strip 302. Still referring to FIG. 3A, in a number of embodiments, the first portion 320 and the second portion 340 may close around a component (not shown) to form an arcuate or at least partially spherical closure 355 in an installed position.

Figure 3B:
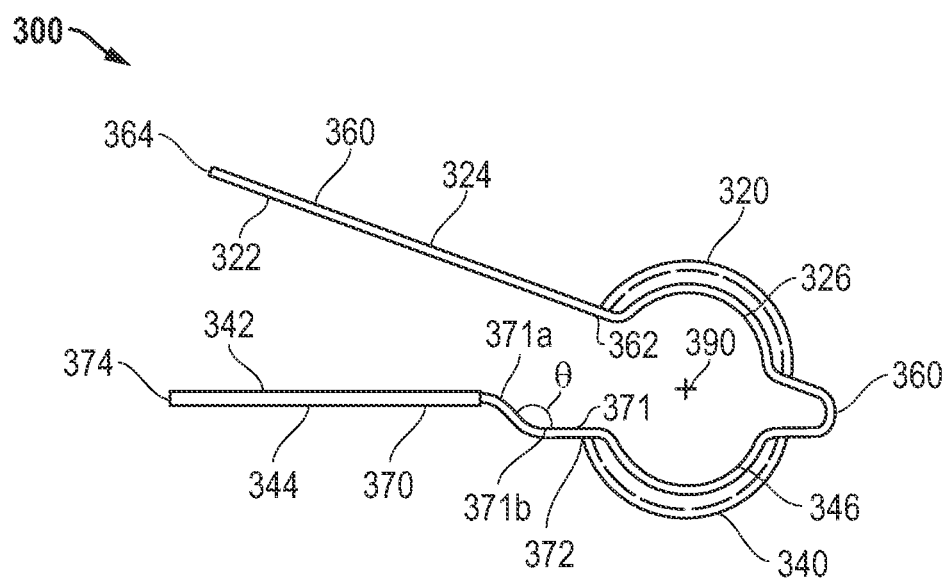
FIG. 3B includes an illustration of a side view of a bearing in an uninstalled position according to a number of embodiments.

FIG. 3B includes an illustration of a side view of a bearing 300 in an uninstalled position according to a number of embodiments and formed from a blank of material or composite material 1000, 1001, 1002, 1003, 1004 as described above. As stated above and as shown in FIG. 3B, the bearing 300 and/or semi-annular strip 302 may include a first portion 320 and a second portion 340 opposing the first portion 320. In a number of embodiments, the first portion 320 and the second portion 340 may not contact each other or be in proximity to each other to form an uninstalled position. The first portion 320 may have an inner surface 322 and an outer surface 324. The first portion 320 may have an arcuate inner surface 326 along a portion of its inner surface 322. The arcuate inner surface 326 may be at least partially hemispherical. The second portion 340 may have an inner surface 342 and an outer surface 344. The second portion 340 may have an arcuate inner surface 346 along a portion of its inner surface 342. The arcuate inner surface 346 may be at least partially hemispherical.

Figure 3C:
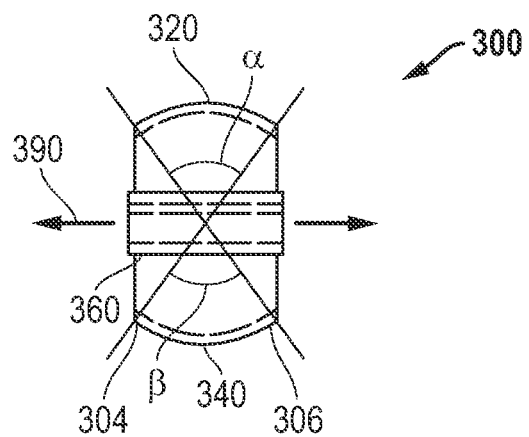
FIG. 3C includes an illustration of a cross sectional view of a bearing in an installed position along axis A-A in FIG. 3A according to a number of embodiments.

FIG. 3C includes an illustration of a cross sectional view of a bearing 300 in an installed position along axis A-A in FIG. 3A. As shown in FIG. 3C, the first portion 320 may have an arc angle α measuring the angle of the first portion 320 from the first axial end 304 to the second axial end 306. By way of a non-limiting embodiment, the angle α can be at least 0.1°, such as at least 2°, at least 4°, at least 5°, or even at least 10°. In another embodiment, the angle α can be no greater than 60°, such as no greater than 45°, no greater than 35°, no greater than 30°, no greater than 25°, or even no greater than 20°. It will be appreciated that the angle α may be within a range between any of the minimum and maximum values noted above. It will be further appreciated that the angle α may be any value between any of the minimum and maximum values noted above.

Still referring to FIG. 3C, the second portion 340 may have an arc angle β measuring the angle of the first portion 340 from the first axial end 304 to the second axial end 306. By way of a non-limiting embodiment, the angle β can be at least 0.1°, such as at least 2°, at least 4°, at least 5°, or even at least 10°. In another embodiment, the angle β can be no greater than 60°, such as no greater than 45°, no greater than 35°, no greater than 30°, no greater than 25°, or even no greater than 20°. It will be appreciated that the angle β may be within a range between any of the minimum and maximum values noted above. It will be further appreciated that the angle β may be any value between any of the minimum and maximum values noted above.

Referring back to FIG. 3B and as stated above, the bearing 300 and/or semi-annular strip 302 may have a folded-over bridge portion 360 disposed between the first portion 320 and the second portion 340 to join the first portion 320 and the second portion 340. The folded-over bridge portion 360 may be arcuate in shape. As shown, the folded-over bridge portion 360 may have a height allowing for a gap between the first portion 320 and the second portion 340. The folded-over bridge portion 360 may be elastic and allow the first position 320 and second position 340 to move between an uninstalled position and an installed position. The folded-over bridge portion 360 may be elastic and provide a springing effect to allow the first position 320 and second position 340 to move between an uninstalled position and an installed position, thus imposing a spring force on the component in the installed position. In a number of embodiments, the folded-over bridge portion 360 may have a length equal to or less than the length of the bearing $L_B$. In this way, the folded-over bridge portion 360 may have exterior notches that reduce the length $L_B$ of the bearing at the folded-over bridge portion 360.

As shown in FIG. 3B, in a number of embodiments, the first portion 320 of the bearing may include an elongated beam 360 extending radially from the central axis 390. The beam 360 may have a proximal end 362 and a distal end 364. As shown in FIG. 3B, the beam 360 may have a circumferential width, $W_{FPF}$, defined as the distance from the proximal end 362 and the distal end 364.

Further, as shown in FIG. 3B, in a number of embodiments, the second portion 340 of the bearing may include an elongated beam 370 extending radially from the central axis 390. The beam 370 may have a proximal end 372 and a distal end 374.

In a number of embodiments, at least one of the beam 360 of the first portion 320 or the beam 370 of the second portion 340 of the bearing 400 may include a tapered region. As shown in FIG. 3B, for example, the beam 370 of the second portion 340 of the bearing 400 may include a tapered region 371. The tapered region 371 may be adapted to form a gap 373 between the beams 360, 370 of the first portion 320 and the second portion 340 that may be contiguous with a semispherical void between the bearing 400 and the at least partially spherical component 375 in an installed position, as discussed in more detail below. The tapered region 371 may form an "S" shape as shown. In a number of embodiments, the tapered region 371 may be located at the proximal end 372 of the beam 370. The tapered region 371 may include a sloped region 371a and a flat region 371b. The sloped region 371a may form an angle θ between the sloped region 371a and the flat region 371b. By way of a non-limiting embodiment, the angle θ can be at least 0.1°, such as at least 2°, at least 4°, at least 5°, or even at least 10°. In another embodiment, the angle θ can be no greater than 60°, such as no greater than 45°, no greater than 35°, no greater than 30°, no greater than 25°, or even no greater than 20°. It will be appreciated that the angle θ may be within a range between any of the minimum and maximum values noted above. It will be further appreciated that the angle θ may be any value between any of the minimum and maximum values noted above. The width of the tapered region 371 may be any value less than the circumferential widths of the beams 360, 370.

Further, referring back to FIG. 3A, the gap 373 formed by the tapered region 371 may have a height, $H_{TR}$, defined as the distance between the first portion 320 and the second portion 340 within the tapered region 371. According to certain embodiment, the height, $H_{TR}$, of the gap 373 formed by the tapered region 371 may be at least about 0.001 mm or at least about 0.05 mm or at least about 0.1 mm or at least about 0.25 mm or even at least about 0.5 mm. According to still other embodiments, the height, $H_{TR}$, of the gap 373 formed by the tapered region 371 may be not greater than about 20 mm, such as, not greater than about 10 mm, 5 mm, 2.5 mm, 1 mm, 0.5 mm or even not greater than about 0.25 mm. In a number of embodiments, the height, $H_{TR}$, of the gap 373 formed by the tapered region 371 may be in the range of at least about 1 mm to no greater than about 10 mm. It will be appreciated that the height, $H_{TR}$, of the gap 373 formed by the tapered region 371 may be within a range between any of the minimum and maximum values noted above. It will be further appreciated that the height, $H_{TR}$, of the gap 373 formed by the tapered region 371 may be any value between any of the minimum and maximum values noted above. It can also be appreciated that the height, $H_{TR}$, of the gap 373 formed by the tapered region 371 may vary along its circumference and may vary across a plurality of bearings. In some instances, the gap 373 may have a height, $H_{TR}$, that increases in size from the distal end 310 to the proximal end 308 of the bearing 300. This may increase the size of the gap 373 from the distal end 310 to the proximal end 308 of the bearing 300.

Figure 4:
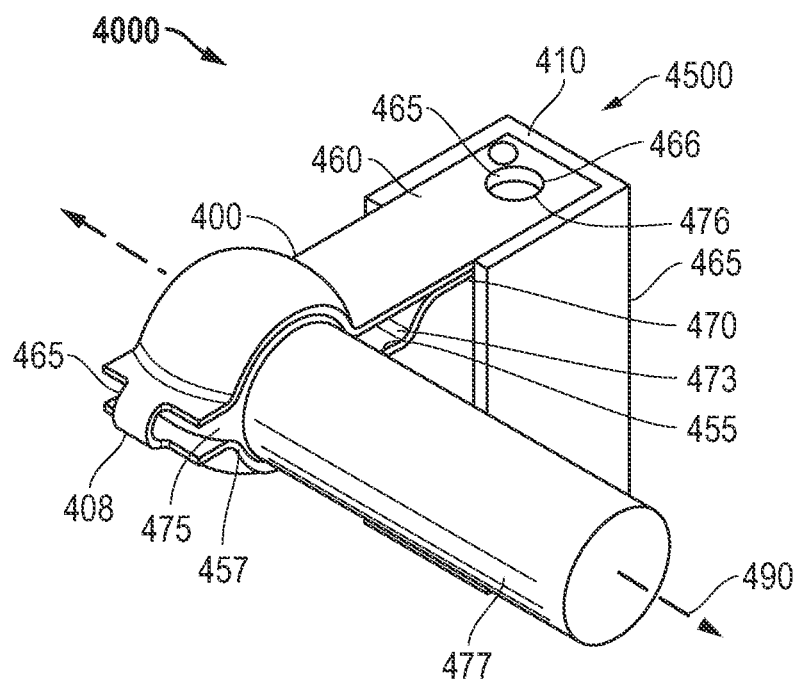
FIG. 4 includes an illustration of a bearing according to embodiments herein used in an exemplary joint assembly according to a number of embodiments.

FIG. 4 includes an illustration of a bearing 400 according to embodiments herein used in an exemplary joint assembly 4000 according to a number of embodiments. In a number of embodiments, the bearing 400 may overlie an at least partially spherical component 475. The at least partially spherical component 475 may include a spherical ball 477. In a number of embodiments, the at least partially spherical component 475 may include a shaft 479 connected to the spherical ball 477. The bearing 400 may overlie the at least partially spherical component 475 in an installed position to at least partially surround and provide a compressive spring force against the at least partially spherical component 475 to form the joint assembly 4000. In a number of embodiments, the bearing 400 may overlie the spherical ball 477 of the at least partially spherical component 475 in an installed position to at least partially surround and provide a compressive spring force against the at least partially spherical component 475 to form the joint assembly 4000.

The bearing 400 may form a joint assembly 4000 that allows for movement of the at least partially spherical component 475. In a number of embodiments, the bearing 400 may form a joint assembly 4000 that allows for rotation movement of the at least partially spherical component 475 about the central axis 490. In a number of embodiments, the bearing 400 may form a joint assembly 4000 that allows for articulating movement (e.g., any movement of the at least partially spherical component 475 that is not rotation while still maintaining the at least partially spherical component 475 within the bearing) of the at least partially spherical component 475 about the central axis 490. In a number of embodiments, the bearing 400 may form a joint assembly 4000 that allows for a combination of articulating movement and rotational movement of the at least partially spherical component 475 about the central axis 490.

FIG. 4 further illustrates a base 465. The base 465 may be operatively connected to the bearing 400. In a number of embodiments, the bearing 400 may be operatively connected to the base 465 to form a mounting system 4500. In a number of embodiments, the distal end 410 of the bearing 400 may be operatively connected to the base 465 to form a cantilever.

Further, as shown in FIG. 4, the beam 460 of first portion 420 may include at least one engagement feature 466 adapted to fix the first portion 420 of the bearing 400 around the at least partially spherical component 475 by fixing the first portion 420 of the bearing 400 to the base 465. Further, as shown in FIG. 4, the beam 470 of second portion 440 may include at least one engagement feature 476 adapted to fix the second portion 440 of the bearing 400 around the at least partially spherical component 475 by fixing the second portion 440 of the bearing 400 to the base 465. The first portion 420 and the second portion 440 of the bearing 400 may be fixed together around the at least partially spherical component 475 by their respective engagement features 466, 476. In a number of embodiments, the first portion 420 may include multiple engagement features 466. In a number of embodiments, the second portion 440 may include multiple engagement features 466. In a number of embodiments, the engagement feature 466, 476 of at least one of the first portion 420 or the second portion 440 may include a bore adapted to house a fastener (not shown). In a number of embodiments, the engagement features 466, 476 of the first portion 420 and the second portion 440 may both include a bore adapted to house a shared fastener. The fastener may secure and fix the bearing 400 to the base 465. The fastener may include screw threads or threadings, screws, bolts, clamps, clasps, clips, latches, pins, rivets, ties, nails, battens, buckle, beam, frog, grommet, hook-and-eye, peg, screw anchor, snap fastener, stitch, threaded fastener, tie, toggle bolt, wedge anchor, pin, groove and stop, nut and bolt, nut and screw, latch, handle, locking nut, tie rivet, or may be a different component. The combination of the engagement features 466, 476 and the fastener may work together to compress the first portion 420 and the second portion 440 of the bearing 400 together around the at least partially spherical component 475 to form the joint assembly 4000 while also operatively connecting or fixing the bearing 400 to the base 465 to form a cantilever.

In a number of embodiments, the bearing 400 may overlie the at least partially spherical component 475 around a portion of its circumference about a central axis 490. In a number of embodiments, the bearing 300 may overlie the at least partially spherical component 475 around less than 360 degrees of the rotating member's 370 circumference due to the presence of a void 457 between the first portion 420 or the second portion 440 in the cross-sectional plane perpendicular to the central axis 490. In a number of embodiments, the bearing 300 may overlie the at least partially spherical component 475 at least 90 degrees, such as at least 120 degrees, such as at least 150 degrees, such as at least 180 degrees, such as at least 210 degrees, such as at least 240 degrees, such as at least 270 degrees, such as at least 300 degrees, such as at least 330 degrees of the circumference of the at least partially spherical component 475. In a number of embodiments, the bearing 300 may overlie the at least partially spherical component 475 no greater than 345 degrees, such as no greater than 300 degrees, such as no greater than 270 degrees, such as no greater than 240 degrees, such as no greater than 210 degrees, such as no greater than 180 degrees, such as no greater than 150 degrees, such as no greater than 119 degrees of the circumference of the inner steering member 104. In a number of embodiments, the bearing 300 may overlie the at least partially spherical component 475 between about 180 degrees and 300 degrees of the circumference of the at least partially spherical component 475.

In a number of embodiments, when the bearing 400 is in the installed position, a void 457 may form around the circumference of the at least partially spherical component 475. As shown, the void 457 may be semispherical around the at least partially spherical component 475. The size of the void 457 may be adjusted depending on how much the bearing 300 overlies the at least partially spherical component 475. As stated above, the void 457 may be contiguous with the gap 473 between the first portion 420 and the second portion 440 in the installed position shown.

Compressive spring force may be observed between the bearing and the at least partially spherical component. Compressive spring force may be defined as the force exerted by the bearing on the at least partially spherical component in an installed position. In a number of embodiments, the compressive spring force may be at least 1 kg·f and no greater than 3 kg·f in a closed position around the partially spherical component.

As stated above, the bearing according to embodiments herein may be used in an assembly. For example, and according to a number of embodiments, the assembly may be a joint assembly for a variety of applications. In some embodiments, the joint assembly may be used in a vehicle.

A method is described according to various embodiments herein. The method may include providing an at least partially spherical component. The method may further include providing a bearing including: a first portion and a complementary second portion integral with the first portion and joined by a folded-over bridge portion, the first portion and the second portion each including an arcuate inner surface, where the bearing includes a metal substrate and a low friction layer overlying at least one surface of the substrate. The method may further include clamping the first portion and the second portion together to at least partially surround and provide a compressive spring force against the component to form a joint assembly, where the first portion and the second portion form a semispherical void around the component. The method may further include operatively connecting the bearing to a base to form a mounting system. The at least partially spherical component may be press fit by a user into the bearing to provide improved ease of assembly.

According to embodiments herein, bearings and joint assembly are provided that may provide improved torque and vibration performance while decreasing weight, packaging size, and number of parts required for the joint assembly. This may allow for improved ease of assembly and a longer lifetime of the joint assembly.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A bearing for an at least partially spherical component, the bearing comprising: a first portion and a complementary second portion integral with the first portion and joined by a folded-over bridge portion, the first portion and the second portion each comprising an arcuate inner surface, wherein the first portion and the second portion are adapted to at least partially surround and provide a compressive spring force against the component to form a joint assembly allowing for rotation of the component, wherein the first portion and the second portion form a semispherical void around the component, and wherein the bearing comprises a metal substrate and a low friction layer overlying at least one surface of the substrate.

Embodiment 2: A joint assembly comprising: an at least partially spherical component; and a bearing comprising: a first portion and a complementary second portion integral with the first portion at least partially surrounding the component, the first portion and the second portion each comprising an arcuate inner surface, wherein the first portion and the second portion are joined by a folded-over bridge portion, wherein the first portion and the second portion are adapted to at least partially surround and provide a compressive spring force against the component to form a joint assembly allowing for rotation of the component, wherein the first portion and the second portion form a semispherical void around the component, and wherein the bearing comprises a metal substrate and a low friction layer overlying at least one surface of the substrate.

Embodiment 3: A mounting system for an at least partially spherical component comprising: a base; and a bearing comprising: a first portion and a complementary second portion integral with the first portion at least partially surrounding the component, the first portion and the second portion each comprising an arcuate inner surface, wherein the first portion and the second portion are joined by a folded-over bridge portion, wherein the first portion and the second portion are adapted to at least partially surround and provide a compressive spring force against the component to form a joint assembly allowing for rotation of the component, wherein the first portion and the second portion form a semispherical void around the component, and wherein the bearing comprises a metal substrate and a low friction layer overlying at least one surface of the substrate, wherein the bearing comprises a distal end and a proximal end, wherein the distal end is operatively connected to the base to form a cantilever.

Embodiment 4: The bearing of embodiment 1, wherein the inner surfaces of the first portion and the second portion are at least partially hemispherical.

Embodiment 5: The bearing of embodiment 1, wherein the folded-over bridge portion comprises exterior notches that reduce the length of the folded-over bridge portion.

Embodiment 6: The bearing of embodiment 1, wherein the folded-over bridge portion has an arcuate shape.

Embodiment 7: The bearing or assembly of any of the embodiments 1-2 and 4-6, wherein the low friction layer is adapted to contact the component.

Embodiment 8: The bearing, assembly, or mounting system of any of the preceding embodiments, wherein the first portion and the second portion contact at least 90° of a circumference of the component, such as at least 120°, such as at least 150°, such as at least 180°, such as at least 210°, such as at least 240°, such as at least 270°, such as at least 300°, or such as at least 330°.

Embodiment 9: The bearing, assembly, or mounting system of any of the preceding embodiments, wherein the at least partially spherical component comprises a spherical ball.

Embodiment 10: The bearing, assembly, or mounting system of any of the preceding embodiments, wherein the at least partially spherical component comprises a shaft.

Embodiment 11: The bearing, assembly, or mounting system of any of the preceding embodiments, wherein the first portion and the second portion each further comprise an elongated beam comprising an engagement feature adapted to fix the first portion and the second portion of the bearing together around the component.

Embodiment 12: The bearing, assembly, or mounting system of embodiment 11, wherein the engagement features on the first and second portion each comprises at least one bore adapted to house a fastener.

Embodiment 13: The bearing, assembly, or mounting system of embodiment 11, wherein the beams of the first portion and the second portion form a gap contiguous with the semispherical void between the bearing and the component in an installed position around the component.

Embodiment 14: The bearing, assembly, or mounting system of embodiment 13, wherein the gap increases in size from the distal end to the proximal end.

Embodiment 15: The assembly of any of embodiments 1-2 and 4-14, wherein the assembly further comprises a base operatively coupled to the bearing through engagement features of the first and second portion.

Embodiment 16: The bearing, assembly, or mounting system of any of the preceding embodiments, wherein the bearing has a compressive spring force in the range of 1 kg·f to 3 kg·f in an installed position around the component.

Embodiment 17: The bearing or assembly of any of embodiments 1-2 and 4-16, wherein the low friction layer comprises a polymer.

Embodiment 18: The bearing, assembly, or mounting system of embodiment 17, wherein the low friction layer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

Embodiment 19: The bearing or assembly of any of embodiments 1-2 and 4-18, wherein the substrate comprises a metal or alloy thereof.

Embodiment 20: The bearing, assembly, or mounting system of embodiment 19, wherein the substrate comprises stainless steel or spring steel.

Note that not all of the features described above are required, that a portion of a specific feature may not be required, and that one or more features may be provided in addition to those described. Still further, the order in which features are described is not necessarily the order in which the features are disclosed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing for an at least partially spherical component, the bearing comprising:
   a first portion and a complementary second portion integral with the first portion and joined by a folded-over elastic bridge portion, the first portion and the second portion each comprising an arcuate inner surface, wherein the first portion and the second portion are adapted to at least partially surround and provide a compressive spring force via the bridge portion against the component to form a joint assembly allowing for rotation of the component, wherein the first portion and the second portion form a semispherical void around the component, and wherein the bearing comprises a metal substrate and a low friction layer overlying at least one surface of the substrate.

2. The bearing of claim 1, wherein the inner surfaces of the first portion and the second portion are at least partially hemispherical.

3. The bearing of claim 1, wherein the folded-over bridge portion comprises exterior notches that reduce the length of the folded-over bridge portion.

4. The bearing of claim 1, wherein the folded-over bridge portion has an arcuate shape.

5. The bearing of claim 1, wherein the low friction layer is adapted to contact the component.

6. The bearing of claim 1, wherein the first portion and the second portion contact at least 90° of a circumference of the component.

7. The bearing of claim 1, wherein the bearing has a compressive spring force in the range of 1 kg·f to 3 kg·f in an installed position around the component.

8. The bearing of claim 1, wherein the low friction layer comprises a polymer.

9. The bearing of claim 8, wherein the low friction layer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

10. The bearing of claim 1, wherein the substrate comprises a metal or alloy thereof.

11. The bearing of claim 10, wherein the substrate comprises stainless steel or spring steel.

12. A joint assembly comprising:
an at least partially spherical component; and
a bearing comprising:
a first portion and a complementary second portion integral with the first portion at least partially surrounding the component, the first portion and the second portion each comprising an arcuate inner surface, wherein the first portion and the second portion are joined by a folded-over elastic bridge portion, wherein the first portion and the second portion are adapted to at least partially surround and provide a compressive spring force via the bridge portion against the component to form a joint assembly allowing for rotation of the component, wherein the first portion and the second portion form a semispherical void around the component, and wherein the bearing comprises a metal substrate and a low friction layer overlying at least one surface of the substrate.

13. The assembly of claim 12, wherein the at least partially spherical component comprises a spherical ball.

14. The assembly of claim 12, wherein the at least partially spherical component comprises a shaft.

15. The assembly of claim 12, wherein the first portion and the second portion each further comprise an elongated beam comprising an engagement feature adapted to fix the first portion and the second portion of the bearing together around the component.

16. The assembly of claim 15, wherein the engagement features on the first and second portion each comprises at least one bore adapted to house a fastener.

17. The assembly of claim 15, wherein the beams of the first portion and the second portion form a gap contiguous with the semispherical void between the bearing and the component in an installed position around the component.

18. The assembly of claim 17, wherein the gap increases in size from the distal end to the proximal end.

19. The assembly of claim 12, wherein the assembly further comprises a base operatively coupled to the bearing through engagement features of the first and second portion.

20. A mounting system for an at least partially spherical component comprising:
a base; and
a bearing comprising:
a first portion and a complementary second portion integral with the first portion at least partially surrounding the component, the first portion and the second portion each comprising an arcuate inner surface, wherein the first portion and the second portion are joined by a folded-over elastic bridge portion, wherein the first portion and the second portion are adapted to at least partially surround and provide a compressive spring force via the bridge portion against the component to form a joint assembly allowing for rotation of the component, wherein the first portion and the second portion form a semispherical void around the component, and wherein the bearing comprises a metal substrate and a low friction layer overlying at least one surface of the substrate, wherein the bearing comprises a distal end and a proximal end, wherein the distal end is operatively connected to the base to form a cantilever.

* * * * *